US008189545B2

(12) United States Patent
Irie et al.

(10) Patent No.: US 8,189,545 B2
(45) Date of Patent: May 29, 2012

(54) WIRELESS COMMUNICATION SYSTEM, WIRELESS LAN ACCESS POINT AND SETTINGS CONFIRMATION/CHANGE METHOD USED THEREFOR

(75) Inventors: Takeshi Irie, Tokyo (JP); Hideki Kurokawa, Tokyo (JP)

(73) Assignee: NEC Infrontia Corporation, Kawasaki, Kanagawa (JP)

( * ) Notice: Subject to any disclaimer, the term of this patent is extended or adjusted under 35 U.S.C. 154(b) by 907 days.

(21) Appl. No.: 11/656,443

(22) Filed: Jan. 23, 2007

(65) Prior Publication Data

US 2007/0171884 A1 Jul. 26, 2007

(30) Foreign Application Priority Data

Jan. 25, 2006 (JP) ................. 2006-015754

(51) Int. Cl.
*H04W 4/00* (2009.01)
*H04B 7/00* (2006.01)
(52) U.S. Cl. ........................ 370/338; 370/310
(58) Field of Classification Search .............. 370/338, 370/310
See application file for complete search history.

(56) References Cited

U.S. PATENT DOCUMENTS

| 7,536,015 | B2* | 5/2009 | Eguchi ................. 380/270 |
| 2004/0148388 | A1 | 7/2004 | Chung et al. |
| 2004/0208151 | A1* | 10/2004 | Haverinen et al. ........... 370/338 |
| 2005/0025103 | A1 | 2/2005 | Ko et al. |
| 2005/0068928 | A1* | 3/2005 | Smith et al. ............. 370/338 |
| 2007/0081477 | A1* | 4/2007 | Jakkahalli et al. ........... 370/310 |

FOREIGN PATENT DOCUMENTS

| JP | 2003-101546 | | 4/2003 |
| JP | 2003-101546 | A | 4/2003 |
| JP | 2004-222001 | A | 8/2004 |
| JP | 2004-282637 | | 10/2004 |
| JP | 2005-101918 | A | 4/2005 |
| JP | 2005-229591 | A | 8/2005 |
| JP | 2005-252561 | A | 9/2005 |

(Continued)

OTHER PUBLICATIONS

Geier, Jim., "Configuring Access Points", www.wi-fiplanet.com/tutorials/article.php/2026541, Mar. 2003.*

(Continued)

*Primary Examiner* — Jinsong Hu
*Assistant Examiner* — Opiribo Georgewill
(74) *Attorney, Agent, or Firm* — McGinn Intellectual Property Law Group, PLLC

(57) ABSTRACT

There is provided a wireless LAN access point capable of confirming and changing the setting using the IP communication for a target wireless LAN access point positively even when the IP address of the wireless LAN access point is forgotten. The wireless LAN access point, upon receipt of a probe request, transmits a probe response while at the same time starting to transmit a beacon frame required to be periodically transmitted. The wireless LAN access point starts the DHCP server therein at the same time that the process of associating the wireless LAN station is started. The DHCP server operates only for the wireless interface of the wireless LAN access point and the wireless LAN station associated by use of the maintenance SSID. The wireless LAN access point, upon complete association of the wireless LAN station with the local access point, leases the IP address to the wireless LAN station from the DHCP server in the particular local access point.

6 Claims, 3 Drawing Sheets

FOREIGN PATENT DOCUMENTS

| | | |
|---|---|---|
| JP | 2005-277937 A | 10/2005 |
| JP | 2006-19994 A | 1/2006 |
| KR | 10-2005-0070190 | 7/2005 |

OTHER PUBLICATIONS

Korean Office Action dated Apr. 29, 2008 with Partial English Translation.

Japanese Office Action Dated Jan. 18, 2011, with partial English translation.

Chinese Office Action dated Apr. 8, 2010 with English translation thereof.

Japanese Office Action dated May 24, 2011, with partial English translation.

* cited by examiner

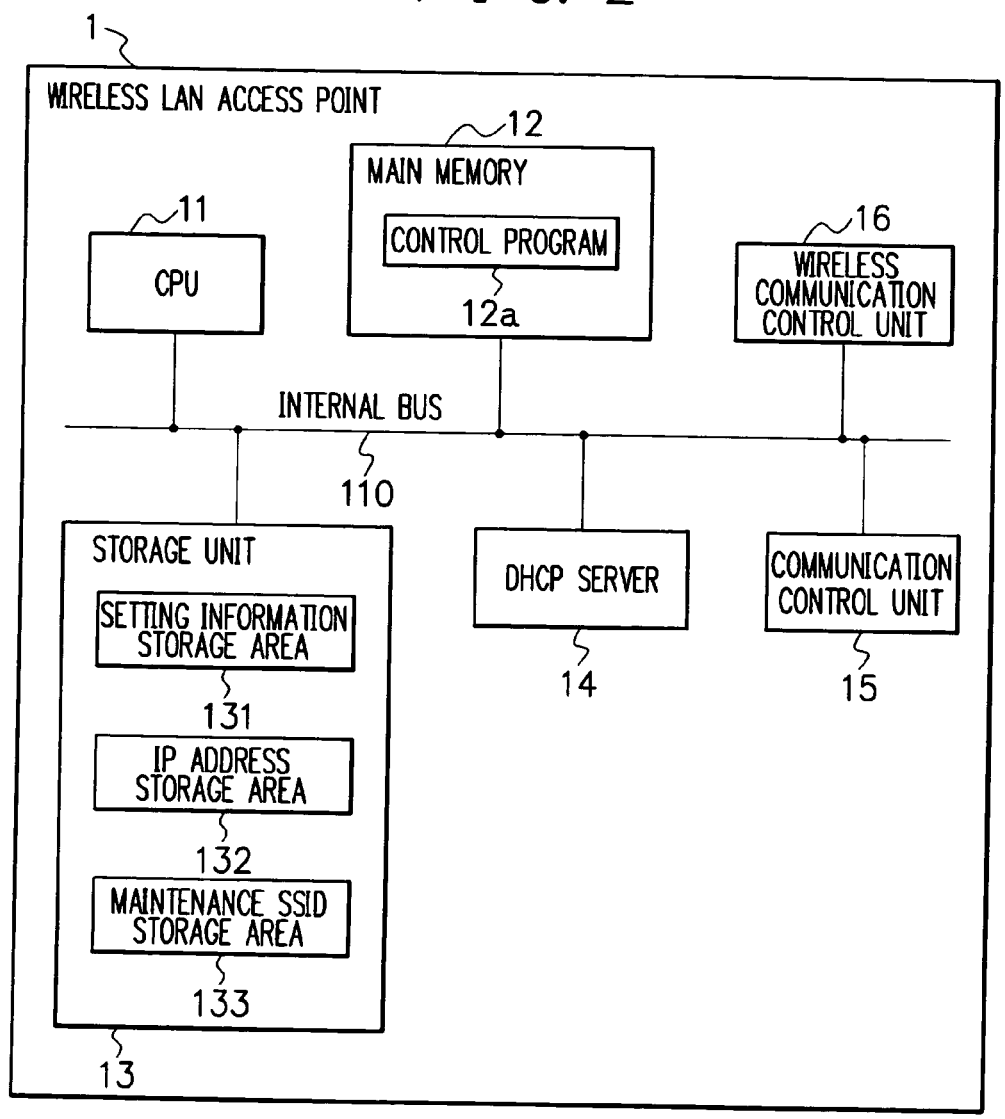

WIRELESS COMMUNICATION SYSTEM, WIRELESS LAN ACCESS POINT AND SETTINGS CONFIRMATION/CHANGE METHOD USED THEREFOR

BACKGROUND OF THE INVENTION

1. Field of the Invention

The present invention relates to a wireless communication system, a wireless LAN (local area network) access point and a settings confirmation/change method used therefore, or more in particular to a wireless LAN access point and the confirmation and change of the settings in a wireless LAN access point in a system using a wireless LAN switch and a wireless LAN access point adapted for a mesh network having no wire line.

2. Description of the Related Art

A conventional wireless LAN access point includes a wireless LAN access point in a system using a wireless LAN switch and a wireless LAN access point adapted for a mesh network having no wire line.

When an IP (internet protocol) address of a wireless LAN access point is forgotten, the common practice is to read out the settings of a wireless LAN access point with a serial console to establish communication with the wireless LAN access point.

In the case where the serial console is lacking, a reset button or the like is outfitted to clear and restore the current setting to a default setting. Namely, a IP address is restored to the state at the time of factory shipment.

In this case, in the wireless LAN access point, the communication with a wireless LAN access point is established by IP communication using the default IP address described in an operation manual or the like, and by thus conducting the IP communication such as WEB or TELNET, the setting of these wireless LAN access points can be changed (see, for example, Japanese Patent Application Laid-Open Nos. 2003-101546 and 2004-282637).

A conventional wireless LAN access point described above, however, is often installed on the ceiling or the like, and once the settings thereof are forgotten, it is required to be connected with a maintenance PC (personal computer) by cable in order to establish communication with the wireless LAN access point. This is a laborious task. Also, in the conventional wireless LAN access point, a serial connector is needed to make possible the confirmation and change of the setting.

In the case of a wireless LAN access point having a reset button, when the settings are forgotten after the access point is activated, there is no choice but to reset the access point to establish communication. Therefore, the operation must be suspended for a while.

Also, the wireless LAN access point is returned to the default setting by resetting, and therefore the current settings cannot be confirmed. Further, the wireless LAN access point, which holds the same IP address as another wireless LAN access point at default setting, cannot be connected to a wired network in a default state.

In the case of a wireless LAN access point adapted for a mesh network having no wire line, the connection from the wire line is impossible for lack of a wire line even if the default IP address is restored using the reset button. Also, this wireless LAN access point cannot establish wireless connection using a wireless channel instead of a wire line, and therefore the communication with the wireless LAN access point cannot be established.

Even when the function to restore the minimum items required for IP address and wireless connection to the default setting is made available by depressing the reset button of the wireless LAN access point, there is a problem that a particular wireless LAN access point connected with the maintenance PC cannot be identified when a wireless LAN access point having the same default setting exists in the neighborhood.

SUMMARY OF THE INVENTION

In view of this situation, the objective of the present embodiments is to obviate the problem described above and to provide a wireless communication system, a wireless LAN access point and a settings confirmation/change method used therefor in which the setting can be confirmed/changed without failure using the IP communication with a target wireless LAN access point even when the IP address of the wireless LAN access point is forgotten.

According to one aspect of the embodiments, there is provided a wireless communication system for conducting wireless communication between a wireless LAN station and a wireless LAN access point, wherein the wireless LAN access point includes means for releasing an IP address to the wireless LAN station that was associated with the wireless LAN access point by use of a maintenance SSID (service set identifier) set in advance.

According to another aspect of the embodiments, there is provided a wireless LAN access point for conducting communication with a wireless LAN station, comprising means for releasing an IP address to the wireless LAN station that was associated with the wireless LAN access point by use of a maintenance SSID set in advance.

According to still another aspect of the embodiments, there is provided a setting content confirmation/change method used with a wireless communication system for conducting wireless communication between a wireless LAN station and a wireless LAN access point, wherein the wireless LAN access point executes a process of releasing an IP address to the wireless LAN station that was associated with the wireless LAN access point by use of a maintenance SSID set in advance.

Namely, in the wireless communication system, even when a wireless LAN access point (or a wireless IAN access point using a wireless LAN switch, or a wireless LAN access point adapted for a mesh network having no wire line, those hereinafter collectively referred to as the wireless LAN access point) has no means to confirm an IP address set in the wireless LAN access point for lack of a display unit or a serial interface, the IP address information of the wireless LAN access point is obtained easily and without failure, and IP communication with the wireless LAN access point is established. Further, communication can be established between the wireless LAN access point and a wireless LAN station such as a maintenance PC (personal computer) and the settings can be changed.

In the wireless communication system according to the embodiments, the function equivalent to the setting change and confirmation of the wireless LAN access point which has previously been carried out through a serial console is made possible by connecting the maintenance PC to the wireless LAN access point through wireless LAN using the MAC (media access control) address of an AP (access point) as an SSID (service set identifier). As a result, a serial port or the function of restoring a setting to the default setting need not be given to the wireless LAN access point.

Also, the wireless communication system according to the embodiments establishes communication through the wireless LAN and thus the conventional cable connection is not required. Thus, the process of confirming the settings of a wireless LAN access point is facilitated.

As described above, according to the embodiments, the IP communication between the wireless LAN access point and the maintenance PC can be established without being informed of the IP address of the wireless LAN access point. Even when the IP address of the wireless LAN access point is forgotten, therefore, the setting confirmation and change call be carried out for a target wireless LAN access point using the IP communication, thereby saving work and time for cable connection.

Also, the setting confirmation and change is possible through the wireless LAN communication, and therefore the serial connector previously required for confirming the settings of the wireless LAN access point is not needed any more.

Further, the default IP address is not required to be assigned to the wireless LAN access point having no serial connector, and therefore, the access point can be connected to a network in the state at the time of factory shipment.

Furthermore, a value unique to the wireless LAN access point is used as the SSID, and therefore even when many wireless LAN access points exist around a client, communication can be established with a target wireless LAN access point.

The embodiments having the configuration and operation described above has the advantage that the setting can be confirmed and changed for a target wireless LAN access point using the IP communication even when the IP address of the wireless LAN access point is forgotten.

BRIEF DESCRIPTION OF THE DRAWINGS

FIG. 1 is a block diagram showing the configuration of a wireless communication system according to an embodiment;

FIG. 2 is a block diagram showing the configuration of the wireless LAN access point 1 in FIG. 1;

DESCRIPTION OF THE PREFERRED EMBODIMENTS

Figure 3:
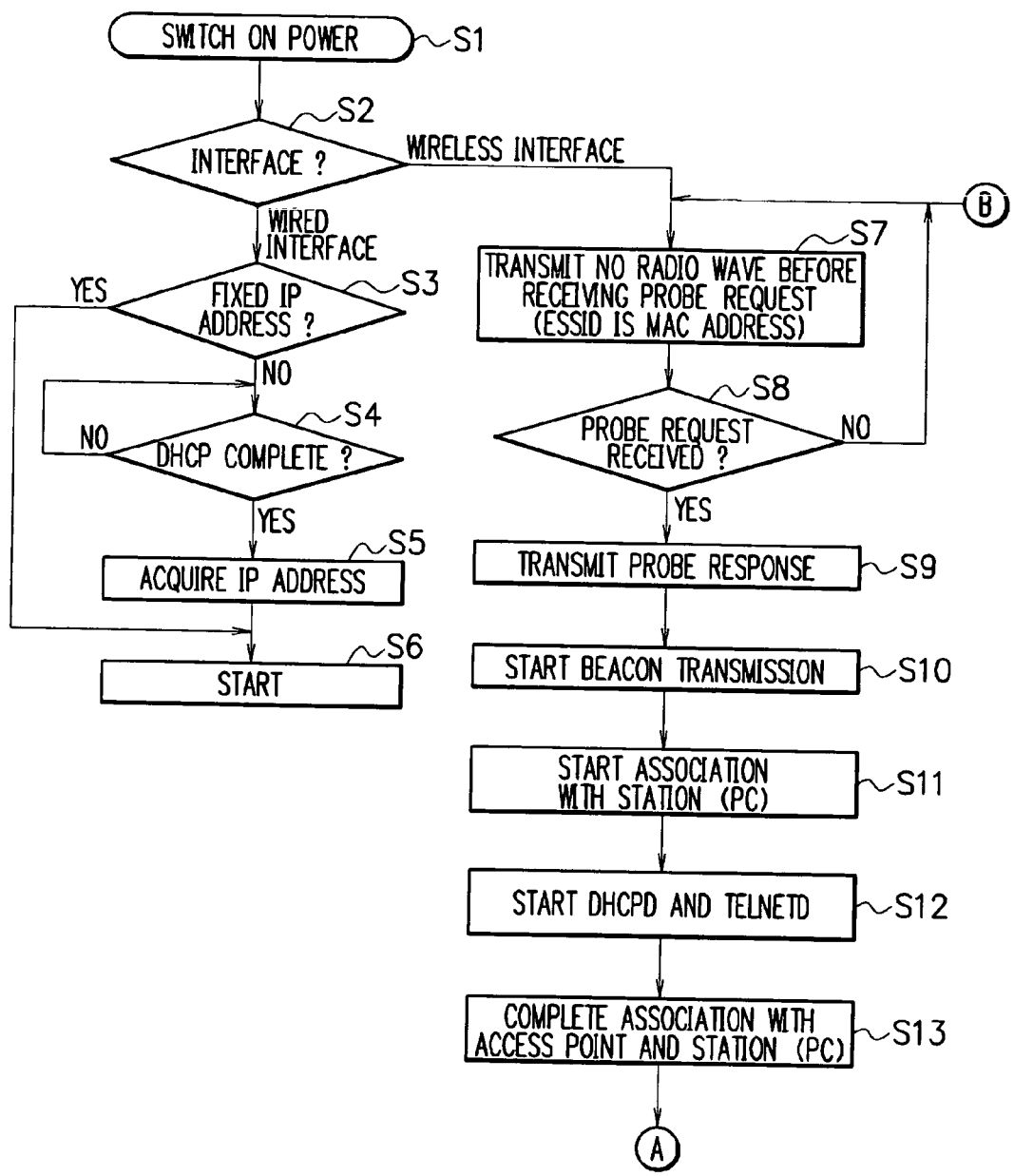
FIG. 3 is a flowchart showing the operation of the wireless LAN access point 1 according to an embodiment.

Preferred embodiments are explained with reference to the drawings. FIG. 1 is a block diagram showing the configuration of a wireless communication system. In FIG. 1, the wireless communication system includes a wireless LAN (local area network) access point (base station) 1 and a wireless LAN station (client terminal) 2 such as a maintenance PC (personal computer).

The wireless LAN access point 1 may be a wireless LAN access point having no serial connector, a wireless LAN access point in a system including a wireless LAN switch and a wireless LAN access point adapted for a mesh network having no wire line.

FIG. 2 is a block diagram showing the configuration of the wireless LAN access point 1 of FIG. 1. In FIG. 2, the wireless LAN access point 1 includes a CPU (central processing unit) 11, a main memory 12 for storing a control program 12a executed by the CPU 11, a storage unit 13 that can be used by the CPU 11 as a working area for execution of the control program 12a, a DHCP (dynamic host configuration protocol) server 14, a communication control unit 15 for controlling the communication through a wire line when a wire line is included, and a wireless control unit 16 for controlling the wireless communication.

In this wireless LAN access point 1, the CPU 11, the main memory 12, the storage unit 13, the DHCP server 14, the communication control unit 15 and the wireless communication control unit 16 are connected to an internal bus 110. Also, the storage unit 13 includes a setting information storage area 131 for storing the setting information of the wireless LAN access point 1, an IP (internet protocol) address storage area 132 for storing an IP address of the wireless LAN access point 1 and a maintenance SSID (service set identifier) storage area 133 for storing a value unique to the wireless LAN access point 1 as the maintenance SSID. The unique value is, for example, the MAC (media access control) address of the wireless LAN access point 1.

The wireless LAN access point 1, normally operating like a HUB, holds an IP stack of its own for IP communication with other devices. Though the wireless LAN access point 1 normally can communicate with other communication devices through a wired LAN or a wireless LAN, a communication device attempting to communicate with the wireless LAN access point 1 must be informed of the IP address of the wireless LAN access point 1 in advance.

Generally, the IP address is obtained by confirming the current IP address by means of the serial console of the wireless LAN access point 1 or by depressing the reset button of the wireless LAN access point 1 to restore the setting to the default IP address.

According to this embodiment, as described above, the settings of the wireless LAN access point 1 can be confirmed or changed without using the serial console or the reset button.

Figure 4:
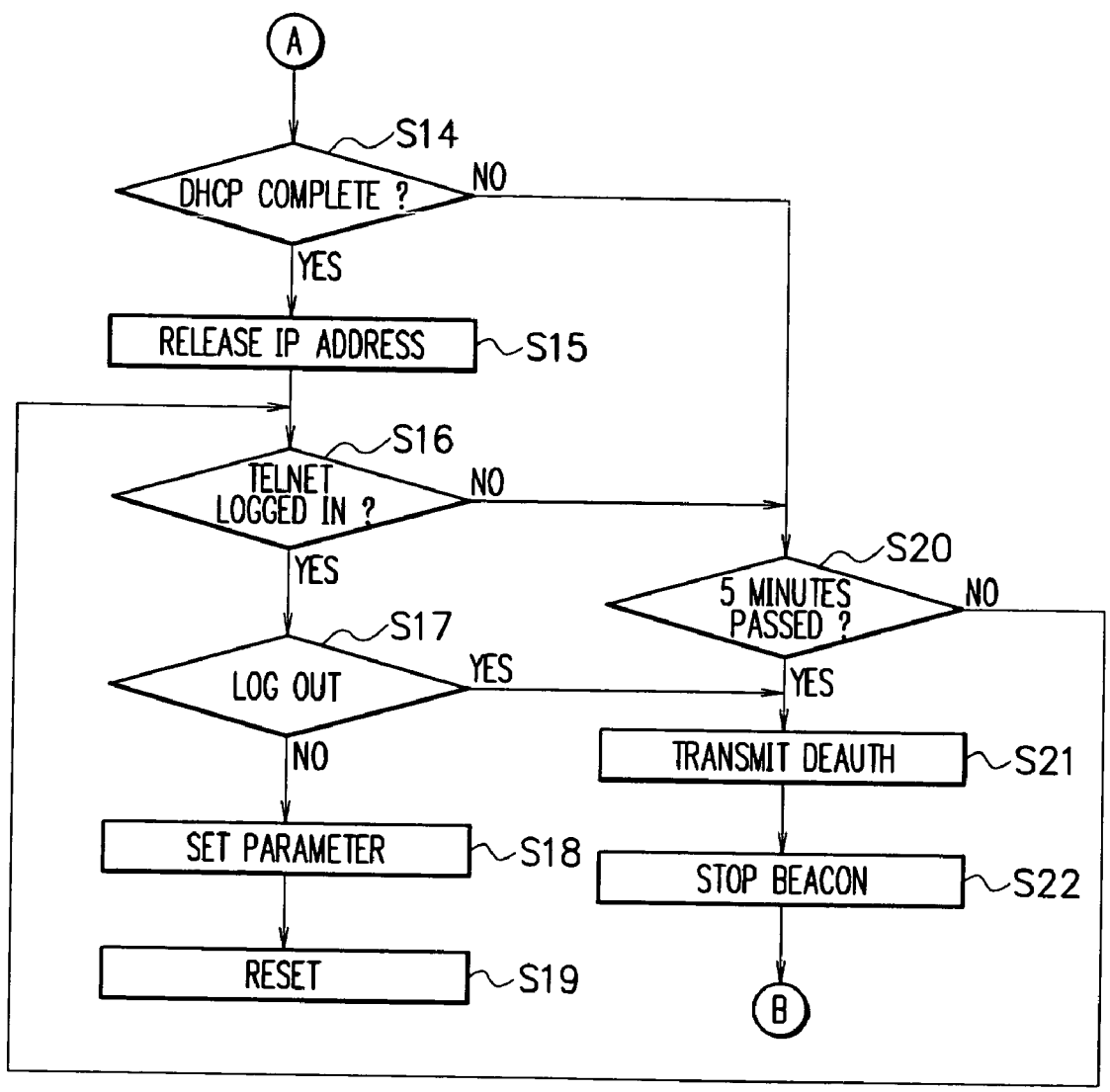
FIG. 4 is a flowchart showing the operation of the wireless LAN access point 1 according to an embodiment.

FIGS. 3 and 4 are flowcharts showing the operation of the wireless LAN access point 1. With reference to FIGS. 1 to 4, the method of confirming or changing the settings in the wireless LAN access point 1 is explained. The processing shown in FIGS. 3 and 4 may be written in the control program 12a, which is executed by the CPU 11.

The wireless LAN access point 1, once switched on (step S1 in FIG. 3), performs for the wired LAN the operations equivalent to those of an ordinary wireless LAN access point (step S2, WIRED INTERFACE). In other words, as long as the wireless LAN station 2 has a fixed IP address (step S3, YES), the wireless LAN access point 1 continues the process (step S6).

Assume, on the other hand, that the wireless LAN station 2 has not a fixed IP address (step S3, NO). Once the IP address is automatically assigned by DHCP to the wireless LAN station 2 (step 4), the wireless LAN access point 1 acquires the IP address of the wireless LAN station 2 (step S5) and starts the process (step S6).

The wireless LAN access point 1 also performs for the wireless LAN the operations equivalent to an ordinary wireless LAN access point (step S2, WIRELESS INTERFACE). That is, the wireless LAN access point 1 constantly transmits radio waves for a normal SSID. For a maintenance SSID, which operates independently of the normal SSID operation, however, the wireless LAN access point 1 transmits no radio wave before receiving a probe request (steps S7, S8). In this case, ESSID (extended service set identifier) is the MAC address of the wireless LAN access point 1.

On the wireless LAN side, as described above, the wireless LAN access point 1 transmits radio waves based on the settings of the transmission channel, the transmission output or the SSID as the ordinary wireless LAN access point does (step S7). The wireless LAN access point 1 waits for arrival of a probe request having a maintenance SSID.

In this case, the maintenance SSID is preferably assigned uniquely to the wireless LAN access point 1. For example, the serial number or the MAC address held uniquely by the wireless LAN access point 1 is desirable instead of a logically assignable IP address.

The wireless LAN access point 1, upon receipt of a probe request having the maintenance SSID (step S8, YES), transmits a probe response (step S9). At the same time, the wireless LAN access point 1 starts to transmit a beacon frame that must be transmitted periodically (step S10).

After that, the process of associating the wireless LAN station 2 with the wireless LAN access point is started (step S11) and the wireless LAN access point 1 activates the DHCP server 14 (both dhcpd and telnetd are started) (step S12). This DHCP server 14 operates only for the wireless interface of the wireless LAN access point 1 on the one hand and only for the wireless LAN station 2 associated with the access point by use of the maintenance SSID on the other hand. In the process, the wireless LAN access point 1 may act as a DHCP client and the wireless LAN station 2 as a DHCP server. Also, the wireless LAN access point 1 is controlled in such a manner that the data from the wireless LAN station 2 may not leak through other wired or wireless interfaces into a network or the network to which the access point belongs.

Once the association process of the wireless LAN station 2 is completed (step S13 and step S14, YES), the wireless LAN access point 1 leases the IP address from the DHCP server 14 to the wireless LAN station 2 (step S15). The wireless LAN station 2 can be informed of the IP address of the DHCP server 14 that has leased the IP address, and therefore can conduct IP communication with the DHCP server 14.

Once the IP communication is established between the wireless LAN station 2 and the DHCP server 14, the settings of the wireless LAN access point 1 can be confirmed or changed by use of telnet or web (steps S16 to S18).

Upon lapse of a predetermined time (for example, 5 minutes in this embodiment) (step S20, YES) without completing a DHCP process for the wireless LAN station 2 (step S14, NO) or without telnet log-in by the wireless LAN station 2 (step S16, NO), the wireless LAN access point 1 transmits "Deauth" (step S21) and stops transmitting a beacon (step S22). After that, the wireless LAN access point 1 returns to step S7 and waits for the receipt of a probe request.

As described above, according to this embodiment, the IP communication with the wireless LAN access point 1 can be established without the IP address of the wireless LAN access point 1. Even when the IP address of the wireless LAN access point 1 is forgotten, therefore, the settings of the wireless LAN access point 1 can be confirmed or changed using the IP communication with the target wireless LAN access point 1. As a result, according to this embodiment, the settings can be confirmed or changed using the wireless LAN communication and cables need not be connected to a access point.

According to this embodiment, in view of the fact that the confirmation or change of the settings is possible using the wireless LAN communication, a serial connector, which is otherwise required to confirm the settings of the wireless LAN access point 1, is not required.

Further, according to this embodiment, a default IP address is no more assigned to a wireless LAN access point having no serial connector, a wireless LAN access point in a system using the wireless LAN switch or a wireless LAN access point adapted for a mesh network having no wire line. Therefore, a access point can be connected to a network without an additional change from an initial state at the time of factory shipment.

Furthermore, according to this embodiment, since the value unique to the wireless LAN access point 1 is used as the SSID, the communication with the target wireless LAN access point 1 can be established without failure even when many wireless LAN access points 1 exist around the wireless LAN station 2.

What is claimed is:

1. A wireless communication system for conducting wireless communication, the wireless communication system comprising:
    a wireless LAN (local area network) terminal; and
    a wireless LAN access point in wireless communication with the wireless LAN terminal, the wireless LAN access point comprising means for releasing an IP (Internet protocol) address to the wireless LAN terminal that was associated with the wireless LAN access point by use of a maintenance SSID (service set identifier) set in advance, the maintenance SSID comprising a number unique to the wireless LAN access point,
    wherein the means for releasing an IP address comprises a DHCP (Dynamic Host Configuration Protocol) server that executes a DHCP process and is provided within the wireless LAN access point,
    wherein the DHCP server is adapted or arranged to execute the DHCP process only for the wireless LAN terminal that was associated with the wireless LAN access point by use of the maintenance SSID,
    wherein the wireless LAN access point is adapted or arranged to, upon receipt of a probe signal including the maintenance SSID from the wireless LAN terminal, start transmission of a beacon frame required to be transmitted periodically and then a process to associate the wireless LAN terminal with the wireless LAN access point,
    wherein the maintenance SSID is at least one of a MAC (media access control) address and a serial number of the wireless LAN access point, and
    wherein the wireless LAN access point is adapted or arranged to prevent data that were sent from the wireless LAN terminal from leaking into a network.

2. The wireless communication system according to claim 1,
    wherein the wireless LAN access point comprises at least one of a wireless LAN access point in a system with a wireless LAN switch and a wireless LAN access point adapted for a mesh network having no wire line.

3. A wireless LAN access point for conducting wireless communication with a wireless LAN (local area network) station, the wireless LAN access point comprising:
    means for communicating with the wireless LAN station; and
    means for releasing an IP address to the wireless LAN station that was associated with the wireless LAN access point by use of a maintenance SSID (service set identifier) set in advance, the maintenance SSID comprising a number unique to the wireless LAN access point,
    wherein the means for releasing an IP address comprises a DHCP (Dynamic Host Configuration Protocol) server that executes a DHCP process and is provided within the wireless LAN access point,
    wherein the DHCP server is adapted or arranged to execute the DHCP process only for the wireless LAN station that was associated with the wireless LAN access point by use of the maintenance SSID, wherein the wireless LAN access point is adapted or arranged to start transmission of a beacon frame required to be transmitted periodically and then a process to associate the wireless LAN station with the wireless LAN access point upon receipt of probe signal including the maintenance SSID from the wireless LAN station, wherein the maintenance SSID comprises at least one of a MAC (media access control) address and a serial number of the wireless LAN access point, and wherein the wireless LAN access point is adapted or arranged to prevent data that were sent from the wireless LAN terminal from leaking into a network.

4. The wireless LAN access point according to claim 3, wherein the wireless LAN access point comprises at least one of a wireless LAN access point in a system with a wireless LAN switch and a wireless LAN access point adapted for a mesh network having no wire line.

5. A setting content confirmation/change method used for a wireless communication system to conduct wireless communication between a wireless LAN station and a wireless LAN (local area network) access point, the method comprising:

executing by the wireless LAN access point, a process of releasing an IP (Internet protocol) address to the wireless LAN station that was associated with the wireless LAN access point by use of a maintenance SSID (service set identifier) set in advance, the maintenance SSID comprising a number unique to the wireless LAN access point; and communicating wirelessly between the wireless LAN station and the wireless LAN access point, wherein the means for releasing an IP address comprises a DHCP (Dynamic Host Configuration Protocol) process that is executed within the wireless LAN access point, wherein the DHCP process is executed only for the wireless LAN station that was associated with the wireless LAN access point by use of the maintenance SSID, wherein the wireless LAN access point, upon receipt of a probe signal including the maintenance SSID from the wireless LAN station, starts transmission of a beacon frame required to be transmitted periodically and then a process to associate the wireless LAN station with the wireless LAN access point, wherein the maintenance SSID comprises at least one of a MAC (media access control) address and a serial number of the wireless LAN access point, and wherein the wireless LAN access point is adapted or arranged to prevent data that were sent from the wireless LAN terminal from leaking into a network.

6. The setting content confirmation/change method according to claim 5, wherein the wireless LAN access point comprises at least one of a wireless LAN access point in a system with a wireless LAN switch and a wireless LAN access point adapted for a mesh network having no wire line.

* * * * *